(12) United States Patent
Menzel et al.

(10) Patent No.: US 9,745,422 B2
(45) Date of Patent: Aug. 29, 2017

(54) PROCESS FOR THE PREPARATION OF A MERCAPTO-TERMINATED LIQUID POLYMER

(71) Applicant: Akzo Nobel Chemicals International B.V., Arnhem (NL)

(72) Inventors: Manfred Menzel, Greiz (DE); Olaf Klobes, Greiz (DE); Volker Burkhardt, Morfelden-Walldorf (DE)

(73) Assignee: AKZO NOBEL CHEMICALS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 15/118,604

(22) PCT Filed: Feb. 23, 2015

(86) PCT No.: PCT/EP2015/053673
§ 371 (c)(1),
(2) Date: Aug. 12, 2016

(87) PCT Pub. No.: WO2015/128270
PCT Pub. Date: Sep. 3, 2015

(65) Prior Publication Data
US 2017/0051113 A1    Feb. 23, 2017

(30) Foreign Application Priority Data

Feb. 27, 2014    (EP) .................... 14157070

(51) Int. Cl.
| | | |
|---|---|---|
| C08G 75/16 | (2006.01) | |
| C08G 75/00 | (2006.01) | |
| C08G 75/10 | (2006.01) | |
| C08L 81/00 | (2006.01) | |
| C08L 81/02 | (2006.01) | |

(52) U.S. Cl.
CPC .......... *C08G 75/16* (2013.01); *C08G 75/00* (2013.01); *C08G 75/10* (2013.01); *C08L 81/00* (2013.01); *C08L 81/02* (2013.01)

(58) Field of Classification Search
CPC .................................................. C07C 319/22
See application file for complete search history.

(56) References Cited

U.S. PATENT DOCUMENTS

| | | | |
|---|---|---|---|
| 2,466,963 A | | 4/1949 | Patrick et al. |
| 2,728,748 A | | 12/1955 | Davis et al. |
| 4,005,053 A | * | 1/1977 | Briggs ............... C08J 3/215 |
| | | | 523/334 |
| 4,124,645 A | | 11/1978 | Bertozzi |
| 4,197,395 A | * | 4/1980 | Lemieux ............ C08K 5/07 |
| | | | 525/385 |
| 5,430,192 A | | 7/1995 | Hobbs et al. |
| 7,262,245 B2 | | 8/2007 | Bons et al. |
| 2003/0050511 A1 | | 3/2003 | Gilmore et al. |
| 2005/0043493 A1 | * | 2/2005 | Smith ............... C08G 61/124 |
| | | | 526/61 |
| 2006/0252913 A1 | * | 11/2006 | Herfert ............. A61L 15/60 |
| | | | 528/480 |

FOREIGN PATENT DOCUMENTS

| | | |
|---|---|---|
| DE | 3826657 A1 | 2/1990 |
| EP | 0332189 A2 | 9/1989 |
| RU | 2010114505 A * 10/2011 ............. C07C 41/56 |  |

OTHER PUBLICATIONS

Kubo et al. ("Mutagenicity Characteristics of 255 Environmental Chemicals", Journal of Health Science, vol. 48, Issue 6, 2002, pp. 545-554).*
J.S. Jorczak, et al, "Polysulfide Liquid Polymers," Industrial and Engineering Chemistry, American Chemical Society, U.S., vol. 43, No. 2, Feb. 1, 1951, pp. 324-328, XP009107340.
Search Report of EP14157070.5, dated Aug. 13, 2014.
International Search Report and Written Opinion of PCT/EP2015/053673, mailed May 4, 2015.

* cited by examiner

*Primary Examiner* — Rosalynd Keys
(74) *Attorney, Agent, or Firm* — Sandra B. Weiss

(57) ABSTRACT

Process for the preparation of a mercapto-terminated liquid polymer comprising the steps of: a) reacting (para)formaldehyde with a halo-alcohol to form a reaction mixture comprising bis(2-dihaloalkyl)formal and b) reacting the reaction mixture of step a) with either (i) sodium polysulfide or (ii) a combination of sodium hydrosulfide and sulfur, wherein the process is performed in the presence of a branching agent selected from the group consisting of di-aldehydes and their corresponding acetals and hemi-acetals.

18 Claims, No Drawings

PROCESS FOR THE PREPARATION OF A MERCAPTO-TERMINATED LIQUID POLYMER

This application is a national stage filing under 35 U.S.C. §371 of PCT/EP2015/053673, filed Feb. 23, 2015, which claims priority to European Patent Application No. 14157070.5, filed Feb. 27, 2014, the contents of which are each incorporated herein by reference in their entireties.

The present invention relates to a process for the preparation of a mercapto-terminated liquid polymer; more in particular a mercapto-terminated liquid polysulfide.

Polysulfides are a class of polymers with alternating chains of several sulfur atoms and hydrocarbons. The general formula for the repeating unit is —[R—$S_x$]$_n$—, where x indicates the number of sulfur atoms, n indicates the number of repeating units and, R indicates the organic backbone of the polymer. Cured polysulfide polymers are resistant to ageing and weathering, highly elastic from −50 to +120° C., and they offer an outstanding chemical resistance, especially against oil and fuel. Because of their properties, these materials find use as base polymer for sealants applied to fill the joints in pavement, insulation glass units, and aircraft structures.

Polysulfides are valuable intermediates for formulating epoxies, polyurethanes and acrylics, especially for their use in coatings, elastomers, and adhesives, or as sealants.

These polymers preferably have mercapto end-groups, because that allows them to be applied in systems that use oxidative curing methods and makes them more reactive towards epoxies and isocyanates.

In order to improve their ease of handling, mixing, and formulating, the polysulfides are preferably liquid at room temperature.

These liquid polymers have a molecular weight of about $8 \cdot 10^2$ to $7 \cdot 10^3$ g/mol and are generally prepared from a bis(2-chloroalkyl)formal, sodium polysulfide, and optionally a branching agent. The resulting polymer is then split into chains of the required lengths by reduction of the disulfide linkages.

Instead of sodium polysulfide, also a mixture of sodium hydrosulfide (NaHS) and sulfur can be used. The advantage of that process is that a splitting step is generally not required.

The branching agent serves to form a three dimensional crosslinked structure after curing of the polysulfide and, consequently, a reinforced hardness with good elastic properties of the cured polymer.

Conventionally, 1,2,3-trichloropropane is used as branching agent. Unfortunately, this substance exhibits cancer-causing properties. Due to these properties, together with its relatively high volatility and its slow reaction in the process, it must be handled in a closed system and high expenditure is necessary to absorb any trichloropropane vapours.

It has now been found that other types of compounds, which do not have or have less of the above mentioned disadvantages, can also serve as suitable branching agents.

These compounds are selected from the group of di-aldehydes and their corresponding actetals and hemiacetals.

The present invention therefore relates to a process for the preparation of a mercapto-terminated liquid polymer comprising the steps of:

a) reacting (para)formaldehyde with a halo-alcohol to form a reaction mixture comprising bis(2-dihaloalkyl)formal and b) reacting the reaction mixture of step a) with either (i) sodium polysulfide or (ii) a combination of sodium hydrosulfide and sulfur, wherein the process is performed in the presence of a branching agent selected from the group consisting of di-aldehydes and their corresponding acetals and hemi-acetals.

The branching agent is selected from the group consisting of di-aldehydes and their corresponding acetals and hemi-acetals.

Said di-aldehydes are preferably selected from compounds having the formula $(O{=})(H)C(CH_2)_nC(H)({=}O)$. In this formula, n is in the range 0-8, more preferably 0-4, and most preferably 0-3.

More specific examples of suitable di-aldehydes are glyoxal (n=0) and glutaric aldehyde (n=3).

Hemi-acetals and acetals corresponding to di-aldehydes are those compounds in which at least one aldehyde functionality of a di-aldehyde has reacted with one, respectively, two alcohol molecules.

Hemi-acetals corresponding to the di-aldehydes of formula $(O{=})(H)C(CH_2)_nC(H)({=}O)$ have the formula $(O{=})(H)C(CH_2)_nC(H)(OR^1)(OH)$ or $(OH)(OR^1)(H)C(CH_2)_nC(H)(OR^1)(OH)$, in which n is in the range 0-8, more preferably 0-4, and most preferably 0-3, and each $R^1$ is independently selected from alkyl groups with 1-10, more preferably 1-6, and most preferably 1 or 2 carbon atoms. Specific examples of suitable hemi-acetals are 2-hydroxy-2-methoxy acetaldehyde and 1,2-diethoxy-1,2-ethanediol.

Acetals corresponding to the di-aldehydes with formula $(O{=})(H)C(CH_2)_nC(H)({=}O)$ have the formula $(O{=})(H)C(CH_2)_nC(H)(OR^1)(OR^2)$ or $(OR^1)(OR^2)(H)C(CH_2)_nC(H)(OR^1)(OR^2)$, in which n is in the range 0-8, more preferably 0-4, and most preferably 0-3, and each $R^1$ and $R^2$ are independently selected from alkyl groups with 1-10, more preferably 1-6, and most preferably 1 or 2 carbon atoms. Specific examples of suitable acetals are glyoxal dimethyl acetal, glyoxal bis(dimethyl acetal), malonic aldehyde bis(diethyl acetal), and glutaric aldehyde bis(dimethyl acetal).

The first step of the process according to the present invention involves the reaction of (para)formaldehyde with a halo-alcohol to form bis(2-dihaloalkyl)formal. In a preferred embodiment, the branching agent is present in step a). This allows the branching agent to react with the halo-alcohol.

In this specification, the term "(para)formaldehyde" includes formaldehyde (i.e. $CH_2O$) and condensation products of formaldehyde having the form $(CH_2O)_n$ that are conventionally referred to as paraformaldehyde. The value of n in this formula is generally in the range 8-100. In the present invention, the use of paraformaldehyde is preferred over formaldehyde.

Suitable halo-alcohols include chloroalcohols, bromoalcohols, and iodoalcohols, whereby chloroalcohols are preferred. Examples of suitable chloroalcohols are ethylene chlorohydrin (ECH), propylene chlorohydrins, butylene chlorohydrins, pentylenechlorohydrins, and hexylenechlorohydrins. ECH is the most preferred chloroalcohol.

This step is acid catalyzed. Suitable acid catalysts are HBr, HCl, $H_2SO_4$, $H_3PO_4$, p-toluene sulfonic acid, sulfonic acid, ferric chloride, and cation exchange resins, such as Amberlyst® 15, 31, 35, 36, 39, 119, 131, Lewatite® K1131, K2431, K 2621, and Nafion® SAC-13.

In step a), the molar ratio of halo-alcohol relative to (para)formaldehyde (calculated as $CH_2O$) is preferably in the range 1.5-3, more preferably 2-2.5 and most preferably 2.2-2.5

The amount of branching agent is preferably in the range 0.01 to 10 mol %, more preferably 0.5-1.5 mol %, and most preferably 0.75-1.25 mole %, relative to (para)formaldehyde (calculated as $CH_2O$).

The amount of acid catalyst is generally in the range of from 0.1 to 10 wt %, based on the weight of entire reaction mixture.

This step is preferably performed by heating the reaction mixture to a temperature in the range 45-80° C., more preferably 50-75° C., and most preferably 55-65° C.

The mixture is preferably heated for 10 minutes to 2 hours, more preferably 20 minutes to 1.5 hours and most preferably 30 to 60 minutes.

The heating is preferably followed by two azeotropic distillation steps in order to remove reaction water and any excess of halo-alcohol, thereby shifting the equilibrium towards the bis(2-dihaloalkyl)formal.

The second process step involves the reaction of the reaction product step a) with either (i) sodium polysulfide or (ii) a combination of sodium hydrosulfide and sulfur. Bis (2-dihaloalkyl)formals that may have been formed in the first step are bis(2-dichloroalkyl)formals, bis(2-dibromoalkyl)formals, and bis(2-diiodoalkyl)formals. Bis(2-dichloroalkyl)formals are preferred. The most preferred bis(2-dihaloalkyl)formal is bis(2-dichloroethyl)formal: $Cl-C_2H_4-O-CH_2-O-C_2H_4-Cl$.

Sodium polysulfide has the formula $Na_2S_x$, wherein x is in the range 2-5, preferably in the range 2-3, and most preferably in the range 2.2-2.5.

The molar ratio of sodium polysulfide (calculated as $Na_2S_x$), relative to bis(2-dihaloalkyl)formal, is preferably in the range 0.8-1.4, more preferably 0.9-1.3, and most preferably 1.0-1.2.

Branching agent may (also) be added in step b). If branching agent is added in step b), it is preferably added in addition to any branching agent that was already present in step a). However, although less preferred, it is also possible to add the entire amount of branching agent used in the process of the present invention during step b).

The molar ratio of sodium hydrosulfide relative to bis(2-dihaloalkyl)formal, is preferably in the range 1-3, more preferably 1.5-2.8, and most preferably 1.8-2.5.

The molar ratio of sodium hydrosulfide relative to sulfur (calculated as S), is preferably in the range 1.5-7, more preferably 3-5, and most preferably 3.8-4.2.

The reaction with sodium polysulfide is preferably performed by first preparing a mixture comprising the product of step a) and any optional compounds, adding this mixture to an aqueous solution of sodium polysulfide and alkali metal hydroxide. Optionally, a dispersing agent, such as magnesium hydroxide, and/or a wetting agent (e.g. sodium butylnaphthalenesulfonate) may be present in the solution.

The mixture is preferably added slowly, e.g. dropwise, to the solution. The temperature of the solution is preferably in the range of 60 to 100° C., more preferably from 80 to 100° C. and most preferably from 90 to 100° C.

After this step, the resulting reaction mixture is preferably treated with a desulfurization agent (e.g. sodium hydroxide and sodium hydrogen sulfide) to eliminate any labile sulfur atoms. This desulfurization step takes place at a preferred temperature of 80-110° C., more preferably 85-105° C., and most preferably 90-100° C. The reaction time is preferably 1-4 hours, more preferably 1-3 hours, and most preferably 1-2 hours.

The obtained high-molecular latex is then preferably subjected to several washing steps in order to remove any soluble salts formed as side products.

In order to obtain a liquid polysulfide, the macromolecules in said latex need to be reduced to the required chain length by reductive splitting of the disulfide bonds.

The most common reduction agents are sodium dithionite ($Na_2S_2O_4$) or a combination of NaHS with $Na_2SO_3$. The amount of reduction agent to be used depends on the desired molecular weight, as commonly know in the art.

The preferred reduction agent in the process according to the invention is sodium dithionite. Reductive splitting using sodium dithionite is preferably performed in 20-40 minutes. The temperature preferably ranges from 80 to 110° C., more preferably from 85 to 105° C. and most preferably from 90 to 100° C.

The splitted disulfide bonds can be converted into reactive terminal thiol groups by acidification to pH 4-5. Acetic acid is preferably used as acidifier. After this last step, the polysulfide can be washed and dewatered under reduced pressure.

The reaction with NaHS and sulfur is preferably performed by first preparing a mixture comprising the product of step a) and any optional compounds and adding this mixture to an aqueous solution of NaHS and sulfur. Preferably, a phase transfer catalyst (PTC), such as a quaternary ammonium compound, is present in the mixture.

The bis(2-dihaloalkyl)formal-containing mixture is preferably added slowly, e.g. dropwise, to the solution. The temperature of the solution is preferably in the range 60 to 100° C., more preferably from 80 to 100° C. and most preferably from 90 to 100° C.

After this step, the resulting reaction mixture is preferably treated with a desulfurization agent (e.g. sodium hydroxide and sodium hydrogen sulfide) to eliminate any labile sulfur atoms. This desulfurization step takes place at a preferred temperature of 80-110° C., more preferably 85-105° C., and most preferably 90-100° C. The reaction time is preferably 1-4 hours, more preferably 1-3 hours, and most preferably 1-2 hours.

The obtained product is then preferably subjected to several washing steps in order to remove any soluble salts formed as side products.

In a preferred embodiment, process step b) is performed with the additional presence of a dihaloalkane and/or a pre-polymer. Even more preferred is a process in which step b) is performed using sodium polysulfide, a dihaloalkane and a pre-polymer.

The use of a dihaloalkane and a pre-polymer allows better control over the sulfur and oxygen content of the resulting polymer and, therefore, over its polarity. The polarity of the polysulfide affects its compatibility with surfaces. Polysulfides are often used as sealants for double glazing and in aircrafts. Hence, good compatibility with relatively polar surfaces like glass and metals such as aluminium, galvanized steel or stainless steel is required for these applications. The polarity is improved with the introduction of more oxygen relative to sulfur atoms. In addition, the flexibility and elasticity of the polymer at low temperatures and the compatibility of the polymer with plasticizers is improved with higher oxygen contents. On the other hand, the chemical resistance against oil and jet fuel improves with a higher content of sulfur relative to oxygen atoms. For aircraft applications, for instance, this leads to conflicting requirements for the sulfur/oxygen ratio of the polymer and having the ability to better control the polarity is therefore highly desired.

The dihaloalkane suitable for this embodiment has the formula X—R—Y, wherein X and Y both are halogen atoms that may be the same or different, and R is an alkane chain with, preferably, 2-10, more preferably 2-6 carbon atoms. Preferably, the dihaloalkane is an alpha-omega dihaloalkane, meaning that the halogen atoms are located at the opposite ends on the alkane chain. The preferred halogen atom is chlorine. Hence, the dihaloalkane is preferably a dichloroalkane, more preferably an alpha-omega dichloroalkane. Examples of suitable dichloroalkanes are 1,2-dichloroethane, 1,2-dichloropropane, 1,3-dichloropropane, 1,4-dichlorobutane, 1,5-dichloropentane, 1,6-dichlorohexane, and isomers thereof.

The prepolymer has the structure (I)

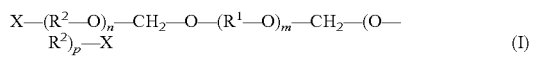

$$X-(R^2-O)_n-CH_2-O-(R^1-O)_m-CH_2-(O-R^2)_p-X \quad (I)$$

wherein $R^1$ and $R^2$ can be the same or different and are selected from alkane chains containing 2-10 carbon atoms, preferably 2-6, and most preferably 2-4 carbon atoms,
X is a halogen atom selected from Cl, Br, and I, preferably Cl,
n, m, and p are integers that can be the same of different and have a value in the range 1-6, preferably 1-4.

Preferably, $R^1$ is —$CH_2$—$CH_2$—.
The preferred nature of $R^2$ is —$CH_2$—$CH_2$—, —$CH_2$—$CH_2$—$CH_2$—, or —$CH_2$—$CH_2$—$CH_2$—$CH_2$—.

The pre-polymer according to structure (I) is obtainable by reacting a polyol with (para)formaldehyde and a halo-alcohol in the presence of an acid catalyst.

Suitable polyols include monoethylene glycol, diethylene glycol, triethylene glycol, tetraethylene glycol, monopropylene glycol, dipropylene glycol, tripropylene glycol, 1,4-butanediol, and mixtures thereof.

Suitable halo-alcohols include chloroalcohols, bromoalcohols, and iodoalcohols, whereby chloroalcohols are preferred. Examples of suitable chloroalcohols are ethylene chlorohydrin (ECH), propylene chlorohydrins, butylene chlorohydrins, pentylenechlorohydrins, and hexylenechlorohydrins. ECH is the most preferred chloroalcohol.

Suitable acid catalysts are HBr, HCl, $H_2SO_4$, $H_3PO_4$, p-toluene sulfonic acid, sulfonic acid, ferric chloride, and cation exchange resins, such as Amberlyst® 15, 31, 35, 36, 39, 119, 131, Lewatite® K1131, K2431, K2621, and Nafion® SAC-13.

In the formation of the pre-polymer, the molar ratio of (para)formaldehyde (calculated as $CH_2O$) relative to OH-functionalities of the polyol is preferably in the range 0.8-1.5, more preferably 0.9-1.3, and most preferably 0.9-1.2.

The molar ratio of halo-alcohol relative to OH-functionalities of the polyol is preferably in the range 0.9-1.5, more preferably 0.9-1.4 and most preferably 1-1.2. The molar ratio of (para)formaldehyde (calculated as $CH_2O$) relative to halo-alcohol is preferably in the range 0.8-1.5, more preferably 0.9-1.3, and most preferably 0.9-1.2.

The amount of acid catalyst is generally in the range of from 0.1 to 10 wt %, based on the weight of entire reaction mixture.

The reaction towards the pre-polymer is preferably performed by heating the reaction mixture to a temperature in the range 45-80° C., more preferably 50-75° C., and most preferably 55-65° C. This heating is preferably performed for 10 minutes to 2 hours, more preferably 20 minutes to 1.5 hours and most preferably 30-60 minutes. It is preferably followed by two azeotropic distillation steps in order to remove reaction water and any excess of halo-alcohol, thereby shifting the equilibrium towards the pre-polymer.

It will be clear from the above that the pre-polymer can be formed in-situ in step a) of the process of the present invention if a polyol is present during step a). The mixture resulting from step a) then contains both bis(2-dihaloalkyl) formal and the pre-polymer.

Alternatively, the pre-polymer can be made separately and is then—either before or during step b)—added to the bis(2-haloalkyl)formal-containing mixture formed in step a).

The mercapto-terminated liquid polymer resulting from the process of the present invention has various applications, including the use as binder in sealants, adhesives, and coating compositions, in isocyanate cure, in epoxy-resin cure, and in acrylate resin cure.

EXAMPLES

Comparative Example A

Step a)

A mixture of 4 moles paraformaldehyde, 10 moles ethylenchlorohydrin (ECH), and 5.4 g 37% HCl was heated to 60° C. while stirring, until the solubilization of the paraformaldehyde occurred. The reaction mixture was then subjected to two azeotropic distillation steps under reduced pressure (120 mbar/54° C. head temperature and 20 mbar/94° C.) in order to remove the reaction water with excess ECH. 680 g bis(2-chloroethyl)formal was formed.

Step b)

2.2 moles of $Na_2S_x$ (x=2.4) in an aqueous 2.1 mol/l solution were mixed with 25.1 g of a 30 wt % aqueous $MgCl_2$ solution and 12.6 g of a 50% NaOH solution (to form in situ $Mg(OH)_2$) and 10 mL of sodium butyl naphthalene sulfonate (a wetting agent). The resulting mixture was heated to 96-98° C. A mixture of 2.2 moles of the bis(2-chloroethyl)formal formed in step a) with 0.04 mol trichloropropane was added dropwise within 1 hour while keeping the temperature between 96 and 98° C. After a post reaction of 30 minutes at 98° C., the reaction mixture was treated with 0.5 mol $Na_2S$ (which was prepared by addition of 0.5 moles NaOH to 0.5 moles NaSH). Finally, the reaction mixture was stirred for 2 hours at 100° C. The formed latex was washed with water several times to remove any soluble salts.

The washed latex was treated with 0.18 moles sodium dithionite (34 g $Na_2S_2O_4$, 90 wt %), 0.6 moles NaOH (50 wt % solution) and 0.2 moles sodium bisulfite (50 mL; 39 wt % solution), while stirring for 30 minutes at 98° C. The resulting product was washed free of soluble salts and coagulated by acidification with acetic acid to a pH in the range 4-5. After coagulation, the polymer is washed free of acetate ions and dewatered under reduced pressure (90° C., 20 mbar). The reaction yielded 350 g of mercapto-terminated polysulfide.

The obtained mercapto-terminated polysulfide was cured with an $MnO_2$-based curing paste, according to a generally known procedure. $MnO_2$ cures the polysulfide resin by oxidation of the SH-terminal groups to disulfide linkages. The prepared test pieces were evaluated regarding their Shore A hardness (SAH)—following the method of DIN 53505—as a measure of the extent of crosslinking.

Result:
After 5 secs: SAH=40
After 3 min: SAH=38
The Shore A hardness before crosslinking was:
After 5 s: SAH=28
After 3 min: SAH=25

Example 1

Comparative Example 1 was repeated, except that 0.05 moles glyoxal (added as 40 wt % water solution) was additionally present in step a) and no trichloropropane was present in step b).

The process yielded 358 g mercapto-terminated polysulfide.

The Shore A hardness of the product was:
After 5 s: SAH=41
After 3 min: SAH=39

Example 2

Example 1 was repeated using 0.05 moles malonic aldehyde bis(diethylacetal) instead of 0.05 moles glyoxal The process yielded 355 g mercapto-terminated polysulfide.

The Shore A hardness of the product was:
After 5 s: SAH=40
After 3 min: SAH=38

Example 3

Example 1 was repeated using 0.05 moles glutaric dialdehyde (add as 50 wt % aqueous solution) instead of 0.05 moles glyoxal.

The process yielded 352 g mercapto-terminated polysulfide.

The Shore A hardness of the product was:
After 5 s: SAH=41
After 3 min: SAH=38

Comparative Example B

Step a)

A mixture of 4 moles paraformaldehyde, 7.5 moles ethylenchlorohydrin (ECH), 1 mol triethylene glycol (TEG) and 5.4 g 37% HCl was heated to 60° C. while stirring until solubilization of the paraformaldehyde. The reaction mixture was then subjected to two azeotropic distillation steps under reduced pressure (120 mbar/54° C. head temperature and 20 mbar/94° C.) in order to remove the reaction water with excess ECH.

This step resulted in the formation of a mixture comprising 680 g pre-polymer with an average molecular weight of 233 g/mol.

Step b)

2.2 moles of $Na_2S_x$ (x=2.4) in an aqueous 2.1 mol/l solution were mixed with 25.1 g of a 30 wt % aqueous $MgCl_2$ solution and 12 g of a 50% NaOH solution (to form in situ $Mg(OH)_2$) and 10 mL of sodium butyl naphthalene sulfonate. The resulting mixture was heated to 88° C.

To this mixture was added—dropwise within 1 hour while keeping the temperature between 88 and 92° C.—a pre-polymer containing mixture consisting of 0.71 mol dichloroethan, 1.07 mol prepolymer of step a and 0.42 mol diformal together with 0.04 mol trichloropropane.

After a post reaction of 30 minutes at 98° C., the reaction mixture was treated with 0.5 mol $Na_2S$ (which was prepared by addition of 0.5 moles NaOH to 0.5 moles NaSH). Finally, the reaction mixture was stirred for 2 hours at 100° C. The formed latex was finally washed with water several times to remove any soluble salts.

The washed latex was treated with 0.18 moles sodium dithionite (34 g $Na_2S_2O_4$, 90 wt %), 0.6 moles NaOH (50 wt % solution) and 0.2 moles sodium bisulfite (50 mL; 39% solution), while stirring for 30 minutes at 98° C. The resulting product was washed free of soluble salts and coagulated by acidification with acetic acid to a pH in the range 4-5. After coagulation, the polymer is washed free of acetate ions and dewatered under reduced pressure (90° C., 20 mbar). The reaction yielded 352 g of mercapto-terminated polysulfide.

The obtained polysulfide was cured with $MnO_2$ as described in Comparative Example A. The prepared test pieces were evaluated regarding their Shore A hardness (SAH) as a measure of the extent of crosslinking.

Result:
After 5 secs: SAH=40
After 3 min: SAH=37
The Shore A hardness before crosslinking was:
After 5 s: SAH=26
After 3 min: SAH=23

Example 4

Comparative Example B was repeated, except that in step a) 0.05 moles glyoxal (added as 40 wt % aqueous solution) was additionally present and no trichloropropane was present in step b).

The Shore A hardness of the product was:
After 5 s: SAH=42
After 3 min: SAH=39

The invention claimed is:

1. A process for the preparation of a mercapto-terminated liquid polymer comprising the steps of:
   a) reacting (para)formaldehyde with a halo-alcohol to form a reaction mixture comprising bis(2-dihaloalkyl) formal and
   b) reacting the reaction mixture of step a) with either (i) sodium polysulfide or (ii) a combination of sodium hydrosulfide and sulfur,
      wherein a branching agent is present in step a) and/or step b), said branching agent being selected from the group consisting of di-aldehydes and their corresponding acetals and hemiacetals.

2. The process according to claim 1 wherein the branching agent is a di-aldehyde with the formula $(O=)(H)C(CH_2)_nC(H)(=O)$, where n is in the range 0-8.

3. The process according to claim 1 wherein the branching agent is a hemi-acetal with the formula $(O=)(H)C(CH_2)_nC(H)(OR^1)(OH)$ or $(OH)(OR^1)(H)C(CH_2)_nC(H)(OR^1)(OH)$, in which n is in the range 0-8 and each $R^1$ is independently selected from alkyl groups with 1-10 carbon atoms.

4. The process according to claim 1 wherein the branching agent is an acetal with the formula $(O=)(H)C(CH_2)_nC(OR^1)(OR^2)$ or $(OR^1)(OR^2)(H)C(CH_2)_nC(H)(OR^1)(OR^2)$, in which n is in the range 0-8 and each $R^1$ and $R^2$ is independently selected from alkyl groups with 1-10 carbon atoms.

5. The process according to claim 2 wherein n is in the range 0-3.

6. The process according to claim 3 wherein each $R^1$ is independently selected from alkyl groups with 1 or 2 carbon atoms.

7. The process according to claim 4 wherein the acetal is selected from the group consisting of glyoxal dimethyl acetal, glyoxal bis(dimethyl acetal), malonic aldehyde bis(diethyl acetal), and glutaric aldehyde bis(dimethyl acetal).

8. The process according to claim 1 wherein the branching agent is present in step a).

9. The process according to claim 8 wherein branching agent is added during step b).

10. The process according to claim 1 wherein the branching agent is used in an amount of 0.01 to 10 mol %, relative to (para)formaldehyde (calculated as $CH_2O$).

11. The process according to claim 1 wherein the halo-alcohol is a chloroalcohol.

12. The process according to claim 1 wherein step b) is conducted in the presence of a dihaloalkane.

13. The process according to claim 1 wherein step a) is conducted in the presence of a polyol.

14. A process for the preparation of a mercapto-terminated liquid polymer comprising the steps of:
   a) reacting (para)formaldehyde with a halo-alcohol to form a reaction mixture comprising bis(2-dihaloalkyl) formal and
   b) reacting the reaction mixture of step a) with either (i) sodium polysulfide or (ii) a combination of sodium hydrosulfide and sulfur,
   wherein a branching agent is present in step a) and/or step b), said branching agent being selected from the group consisting of di-aldehydes and their corresponding acetals and hemiacetals, and
   wherein step b) is conducted in the presence of a prepolymer with the structure $$X-(R^2-O)_n-CH_2-O-(R^1-O)_m-CH_2-(O-R^2)_p-X$$

wherein $R^1$ and $R^2$ can be the same or different and are selected from alkane chains containing 2-10 carbon atoms, X is a halogen atom selected from Cl, Br and I, and n, m, and p are integers that can be the same or different and have a value in the range 1-6.

15. The process according to claim 14 wherein X is Cl, $R^1$ is $-CH_2-CH_2-$, and $R^2$ is $-CH_2-CH_2-$, $-CH_2-CH_2-CH_2-$, or $-CH_2-CH_2-CH_2-CH_2-$.

16. The process according to claim 3 wherein n is in the range 0-3.

17. The process according to claim 4 wherein n is in the range 0-3.

18. The process according to claim 4 wherein each $R^1$ and/or $R^2$ is independently selected from alkyl groups with 1 or 2 carbon atoms.

* * * * *

UNITED STATES PATENT AND TRADEMARK OFFICE
CERTIFICATE OF CORRECTION

PATENT NO. : 9,745,422 B2
APPLICATION NO. : 15/118604
DATED : August 29, 2017
INVENTOR(S) : Manfred Menzel et al.

It is certified that error appears in the above-identified patent and that said Letters Patent is hereby corrected as shown below:

In the Claims

Claim 4, Column 8, Lines 50-51 should read:
agent is an acetal with the formula $(O=)(H)C(CH_2)_nC(H)(OR^1)(OR^2)$ or $(OR^1)(OR^2)(H)C(CH_2)_nC(H)(OR^1)(OR^2)$, Signed and Sealed this
Tenth Day of October, 2017

Joseph Matal
*Performing the Functions and Duties of the*
*Under Secretary of Commerce for Intellectual Property and*
*Director of the United States Patent and Trademark Office*